(12) United States Patent
Nagatani

(10) Patent No.: US 10,518,664 B2
(45) Date of Patent: Dec. 31, 2019

(54) VEHICLE SEAT

(71) Applicant: TOYOTA BOSHOKU KABUSHIKI KAISHA, Aichi (JP)

(72) Inventor: Yuki Nagatani, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/964,740

(22) Filed: Apr. 27, 2018

(65) Prior Publication Data

US 2018/0334057 A1 Nov. 22, 2018

(30) Foreign Application Priority Data

May 18, 2017 (JP) ................................ 2017-098963

(51) Int. Cl.
*B60N 2/015* (2006.01)
*B60N 2/12* (2006.01)
(Continued)

(52) U.S. Cl.
CPC ............. *B60N 2/045* (2013.01); *B60N 2/507* (2013.01); *B60N 2/919* (2018.02)

(58) Field of Classification Search
CPC ...... B60N 2/045; B60N 2/919; B60N 2/0705; B60N 2/0715; B60N 2/1615; B60N 2/507
USPC .............. 297/216.1, 216.15, 215.16, 216.17, 297/215.18, 344.15, 344.16, 344.17, 297/452.18
See application file for complete search history.

(56) References Cited

U.S. PATENT DOCUMENTS

| 6,334,643 B1 * | 1/2002 | Lindblad | B60N 2/4228 |
| | | | 297/216.16 X |
| 6,347,778 B1 * | 2/2002 | Koga | B60N 2/1615 |
| | | | 297/344.17 X |

(Continued)

FOREIGN PATENT DOCUMENTS

| DE | 102013106250 | 12/2014 |
| DE | 102015209323 | 11/2015 |

(Continued)

OTHER PUBLICATIONS

German Office Action English translation of corresponding German patent application No. 10 2018 207 150.0, dated Aug. 7, 2019, along with English translation.

*Primary Examiner* — Rodney B White
(74) *Attorney, Agent, or Firm* — Greenblum & Bernstein, P.L.C.

(57) ABSTRACT

Disclosed is one example of a vehicle seat that can inhibit a large displacement of a cushion frame along a seat-width axis. The vehicle seat includes a cushion frame; a bracket coupled to a vehicle body; a lifter link that couples the cushion frame to the bracket and supports the cushion frame; and a first restrictor included in the bracket. The bracket is configured to couple the cushion frame to the vehicle body. The lifter link is pivotable along a front-rear axis of the seat with an upper end of the lifter link being pivotably coupled to the cushion frame and a lower end of the lifter link being pivotably coupled to the bracket. The first restrictor restricts a displacement of the lifter link along the seat-width axis in response to an abutment of the first restrictor against a first abutting portion included in the lifter link.

9 Claims, 5 Drawing Sheets

(51) Int. Cl.
*B60N 2/18* (2006.01)
*B60N 2/04* (2006.01)
*B60N 2/90* (2018.01)
*B60N 2/50* (2006.01)

(56) References Cited

U.S. PATENT DOCUMENTS

| | | | | |
|---|---|---|---|---|
| 6,733,075 | B2* | 5/2004 | Schumann | B60N 2/1615 |
| | | | | 297/216.1 |
| 7,766,427 | B2* | 8/2010 | Kojima | B60N 2/06 |
| | | | | 297/344.15 X |
| 8,353,558 | B2* | 1/2013 | Okamoto | B60N 2/1615 |
| | | | | 297/216.1 |
| 8,596,721 | B2* | 12/2013 | Ozawa | B60N 2/165 |
| | | | | 297/344.15 X |
| 8,985,686 | B2* | 3/2015 | Breitfeld | B60N 2/1615 |
| | | | | 297/344.15 X |
| 2006/0001306 | A1* | 1/2006 | Becker | B60N 2/002 |
| | | | | 297/344.15 |
| 2007/0194613 | A1* | 8/2007 | Kojima | B60N 2/0705 |
| | | | | 297/344.15 |
| 2007/0284922 | A1* | 12/2007 | Matsuhashi | B60N 2/1615 |
| | | | | 297/216.2 |
| 2009/0218868 | A1* | 9/2009 | Koga | B60N 2/1839 |
| | | | | 297/344.17 |
| 2011/0025106 | A1 | 2/2011 | Okamoto et al. | |
| 2011/0241391 | A1* | 10/2011 | Lamparter | B60N 2/24 |
| | | | | 297/216.1 |
| 2012/0074743 | A1* | 3/2012 | Asakura | B60N 2/1615 |
| | | | | 297/216.1 |
| 2012/0286553 | A1* | 11/2012 | Sharda | B60N 2/688 |
| | | | | 297/344.15 |
| 2013/0147241 | A1* | 6/2013 | Park | B60N 2/1615 |
| | | | | 297/216.1 |
| 2013/0300164 | A1* | 11/2013 | Jonsson | B60N 2/42727 |
| | | | | 297/216.1 |
| 2014/0183918 | A1* | 7/2014 | Kaku | B60N 2/002 |
| | | | | 297/344.15 |
| 2014/0216241 | A1* | 8/2014 | Lamparter | B60N 2/502 |
| | | | | 89/36.08 |
| 2014/0216242 | A1* | 8/2014 | Lamparter | B60N 2/502 |
| | | | | 89/36.08 |
| 2014/0339874 | A1* | 11/2014 | Behrens | B60N 2/1615 |
| | | | | 297/344.15 |
| 2015/0091358 | A1* | 4/2015 | Hattori | B60N 2/06 |
| | | | | 297/452.2 |
| 2015/0239370 | A1* | 8/2015 | Hoshi | B60N 2/682 |
| | | | | 297/344.15 |
| 2015/0307007 | A1* | 10/2015 | Shinozaki | B60N 2/06 |
| | | | | 297/344.1 |
| 2015/0336477 | A1 | 11/2015 | Matsui | |
| 2015/0352986 | A1* | 12/2015 | Fujita | B60N 2/68 |
| | | | | 297/216.1 |
| 2016/0107549 | A1* | 4/2016 | Janicek | B60N 2/0722 |
| | | | | 297/216.1 |
| 2017/0197525 | A1* | 7/2017 | Hattori | B60N 2/0705 |
| 2017/0327008 | A1* | 11/2017 | Schulz | B60N 2/1615 |
| 2018/0086237 | A1* | 3/2018 | Couasnon | B60N 2/1615 |
| 2018/0334056 | A1* | 11/2018 | Nagatani | B60N 2/0244 |
| 2019/0111811 | A1* | 4/2019 | Stutika | B60N 2/933 |
| 2019/0118685 | A1* | 4/2019 | Pleskot | B60N 2/045 |

FOREIGN PATENT DOCUMENTS

| | | |
|---|---|---|
| EP | 2279899 | 2/2011 |
| JP | 5026478 | 9/2012 |

* cited by examiner

VEHICLE SEAT

CROSS-REFERENCE TO RELATED APPLICATIONS

This international application claims the benefit of Japanese Patent Application No. 2017-098963 filed on May 18, 2017 with the Japan Patent Office, the entire disclosure of which is incorporated herein by reference.

BACKGROUND

The present disclosure relates to a vehicle seat that is mounted onto a vehicle.

For example, according to a vehicle seat of Japanese Patent No. 5026478, a side frame abuts against a bracket, thereby inhibiting a cushion frame to excessively descend downwardly.

The side frame forms a part of a cushion frame. The cushion frame forms a framework of a seat cushion. The bracket couples the cushion frame to a vehicle body.

SUMMARY

Where a cushion frame is supported by a bracket via a lifter link, an upper end of the lifter link is pivotably coupled to the cushion frame, and a lower end of the lifter link is pivotably coupled to the bracket. The lifter link pivots along a front-rear axis of a seat, thereby supporting the cushion frame in a descendible and ascendible manner.

With such a configuration, the cushion frame is highly likely to be largely displaced along a seat-width axis. In one aspect of the present disclosure, it is desirable to provide a vehicle seat that can inhibit a large displacement of a cushion frame along a seat-width axis.

The present disclosure relates to a vehicle seat that is mounted onto a vehicle. The vehicle seat comprises: a cushion frame that forms a framework of a seat cushion; a bracket that is coupled to a vehicle body; a lifter link that couples the cushion frame to the bracket and supports the cushion frame; and a first restrictor that is included in the bracket. The bracket is configured to couple the cushion frame to the vehicle body. The lifter link is pivotable along a front-rear axis of the seat with an upper end of the lifter link being pivotably coupled to the cushion frame and a lower end of the lifter link being pivotably coupled to the bracket. The first restrictor restricts a displacement of the lifter link along a seat-width axis in response to an abutment of the first restrictor against a first abutting portion that is included in the lifter link.

Such a configuration can inhibit the cushion frame to be largely displaced along the seat-width axis.

The lifter link is pivotably coupled to the cushion frame and the bracket. In such a configuration, the cushion frame is displaced downwardly in response to the large displacement of the cushion frame along the seat-width axis.

Accordingly, using the bracket and the lifter link, which are coupled to each other, to restrict the displacement of the cushion frame along the seat-width axis can inhibit the displacement while reducing the number of members and parts.

The vehicle seat may be configured as follows.

An upper end of the bracket may include a second restrictor that is configured to restrict a downward displacement of the lifter link in response to an abutment of the second restrictor against a second abutting portion that is included in an edge of the lifter link. Such a configuration can inhibit the cushion frame to be largely displaced along the seat-width axis and an up-down axis.

The cushion frame may comprise a first side frame that extends along the front-rear axis of the seat and a second side frame that is located a distance from the first side frame along the seat-width axis and extends along the front-rear axis of the seat.

The upper end of the lifter link may be coupled to the first side frame. The lower end of the lifter link may be coupled to the bracket with the lower end of the lifter link being located closer to the second side frame than the bracket is. The first restrictor may be located closer to the second side frame than the first abutting portion is. In the vehicle seat with such a configuration, the cushion frame is likely to be largely displaced toward a second side frame-side, thus enhancing an effect to inhibit the displacement.

The first restrictor may he located in a first protrusion that protrudes toward the second side frame. With such a configuration, it is possible to arrange the first restrictor easily.

The first abutting portion may be located in a second protrusion that oppositely protrudes with respect to the second side frame. With such a configuration, it is possible to arrange the first abutting portion easily.

Where the first restrictor and the first abutting portion are included in respective protrusions, it is possible to inhibit the first restrictor and the first abutting portion to abut against each other at a position a significant distance from the bracket in the seat-width axis. It is therefore possible to reduce a significant bending moment to act on the bracket in response to the abutment between the first restrictor and the first abutting portion.

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

Figure 1:
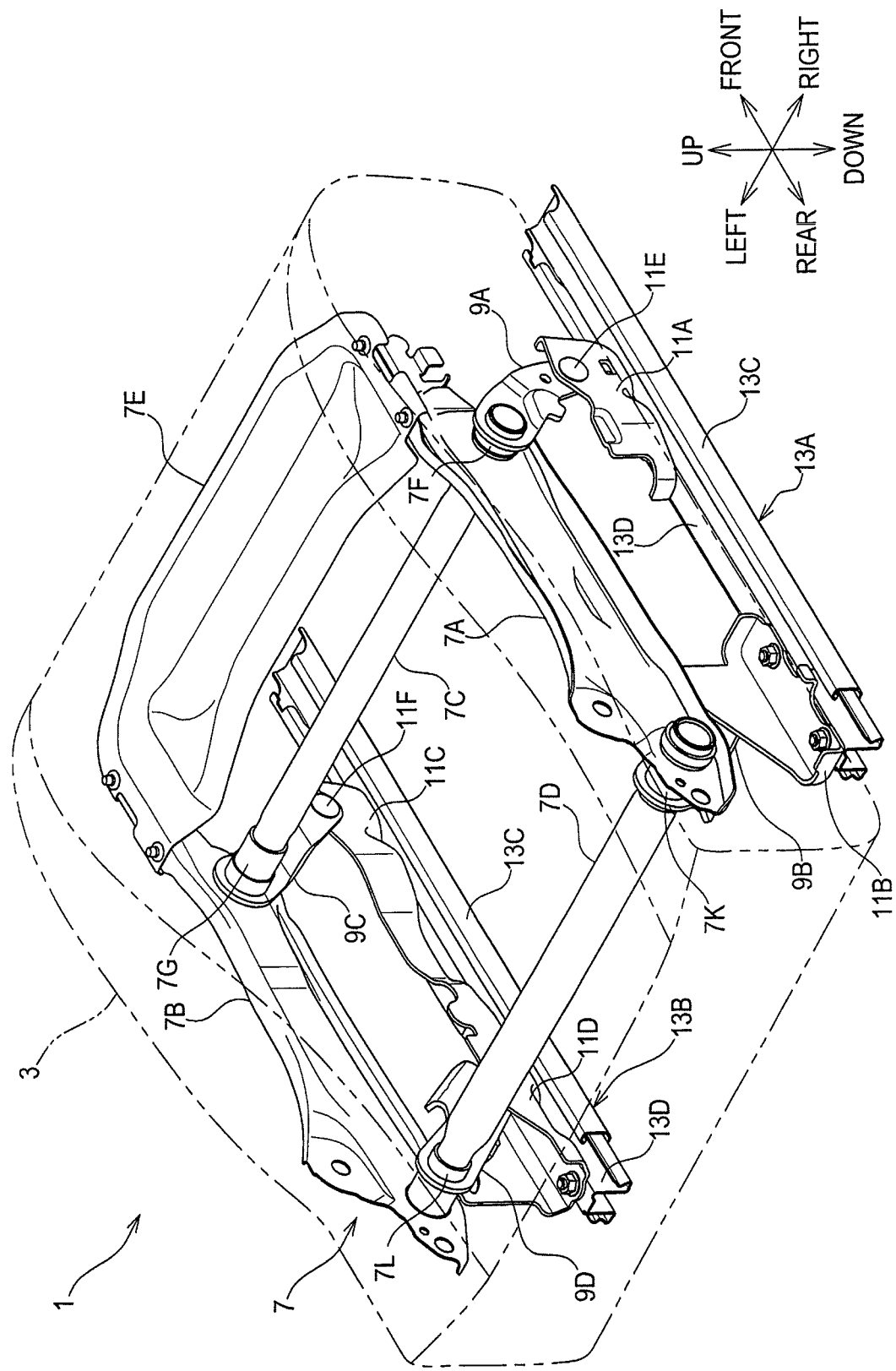
FIG. 1 is a view showing an overview of a vehicle seat according to the present embodiment.

"Embodiments" to be described below are example embodiments of the present embodiment within the technical scope of the present disclosure. In other words, invention-specifying-matters recited in claims are not limited to specific configurations, structures, and the like, shown in the embodiments below.

Arrows and other marks that indicate directions labelled on each drawing are made for easy understanding of relationships between each drawing. The present disclosure is not limited to the arrows and other marks (directions) labelled on each drawing.

At least in respect of a member or portion that is labeled with a reference numeral for explanations, there is at least one in number of such a member or portion unless the number is otherwise specified, for example, as "one of." In other words, there may be two or more of such a member or portion indicated.

(First Embodiment)

1. Overview of Vehicle Seat

As shown in FIG. 1, a vehicle seat 1 comprises at least a seat cushion 3 and a cushion frame 7. The seat cushion 3 supports the buttocks of the occupant.

The cushion frame 7 forms a framework of the seat cushion 3. The cushion frame 7 comprises a first side frame 7A, a second side frame 7B, and the like. In the present embodiment, the first side frame 7A is located in the right side of the seat and extends along a front-rear axis of the seat (hereinafter simply referred to as a front-rear axis).

The second side frame 7B is located a distance from the first side frame 7A along a seat-width axis (in the left side of the seat, in the present embodiment) and extends along the front-rear axis. The seat-width axis is hereinafter simply referred to as a width axis. The first side frame 7A is coupled to the second side frame 7B via a first coupling rod 7C and a second coupling rod 7D.

The first coupling rod 7C extends along the width axis and couples the first side frame 7A to the second side frame 7B in respective front ends thereof via collars 7F and 7G, respectively. The second coupling rod 7D extends along the width axis and couples the first side frame 7A to the second side frame 7B in respective rear ends via collars 7K and 7L, respectively.

A front panel 7E supports a seat-front end of the seat cushion 3. The front panel 7E extends so as to bridge the first side frame 7A and the second side frame 7B together in the respective front ends thereof, and is fixed to the first side frame 7A and the second side frame 7B.

2. Cushion Frame Supporting Structure 2.1 Overview of Supporting Structure

The cushion frame 7 is supported by and fixed to a vehicle body via lifter links 9A to 9D and brackets 11A to 11D. Specifically, the brackets 11A to 11D are coupled to the vehicle body such as a floor panel for an automobile, and designed to couple the cushion frame 7 to the vehicle body.

The brackets 11A to 11D according to the present embodiment are fixed to the vehicle body via respective seat sliding devices 13A and 13B. The seat sliding devices 13A and 13B support and fix the vehicle seat 1 to the vehicle body such that the vehicle seat 1 is displaceable with respect to the vehicle body.

The seat sliding devices 13A and 13B comprises fixed rails 13C that are fixed to the vehicle body, and movable rails 13D that are slidable with respect to the fixed rails 13C. The brackets 11A and 11B are fixed to the movable rail 13D of the sliding device 13A that is arranged to correspond to the first side frame 7A.

The brackets 11C and 11D are fixed to the movable rail 13D of the seat sliding device 13B that is arranged to correspond to the second side frame 7B. The bracket 11C and the bracket 11D according to the present embodiment are configured integrally as one metal piece.

In respective upper ends, the lifter links 9A to 9D are pivotably coupled to the cushion frame 7. In respective lower ends, the lifter links 9A to 9D are respectively pivotably coupled to the brackets 11A to 11D.

Specifically, the respective upper ends of the lifter links 9A and 9C are fixed to the first coupling rod 7C, respectively via the collars 7F and 7G, by a fixing method such as welding. The first coupling rod 7C is rotatably coupled to the first side frame 7A and the second side frame 7B, respectively via the collars 7F and 7G.

The respective lower ends of the lifter links 9A and 9C are respectively pivotably assembled to the brackets 11A and 11C, respectively via coupling pins 11E and 11F. The respective upper ends of the lifter links 9B and 9D are fixed to the second coupling rod 7D, respectively via the collars 7K and 7L by the fixing method such as welding.

The second coupling rod 7D is rotatably coupled to the first side frame 7A and the second side frame 7B, respectively via the collars 7K and 7L. The respective lower ends of the lifter links 9B and 9D are respectively pivotably assembled to the brackets 11B and 11D via respective pins (not shown).

As with the first coupling rod 7C and the second coupling rod 7D, each coupling pin is rotationally symmetric about a center axis that is parallel with the width axis. Thus, the lifter links 9A to 9D pivot about the width axis, which is the center axis, along the front-rear axis.

In a pivotal manner, the lifter links 9A to 9D are manually operated or driven by an actuator such as an electric motor. In response to pivoting of the lifter links 9A to 9D, the cushion frame 7 descends or ascends. In other words, the lifter links 9A to 9D serve as a part of mechanism to perform descending and ascending of the seat cushion 3.

The first side frame 7A is located closer to the second side frame 7B than the respective upper ends of the lifters link 9A and 9B are, in other words, located in the left side in the width axis. The respective lower ends of the lifter links 9A and 9B are located closer to the second side frame 7B than the brackets 11A and 11B are. In other words, the first side frame 7A is positioned in the left side in the width axis respective distances from the brackets 11A and 11B.

2.2 Restriction Mechanism

In the present embodiment, provided are a first restriction structure 101 and a second restriction structure 102 that are designed to restrict a displacement of the cushion frame 7. The first restriction structure 101 mechanically restricts the displacement of the cushion frame 7 along the width axis (in the left direction of the seat, in the present embodiment) beyond a specific position. Hereinafter the left direction of the seat is simply referred to as the left direction.

The second restriction structure 102 mechanically restricts a descendant of the cushion frame 7 further below a specific position. The above two restriction structures are configured by at least the lifter link 9A and the bracket 11A.

Figure 2:
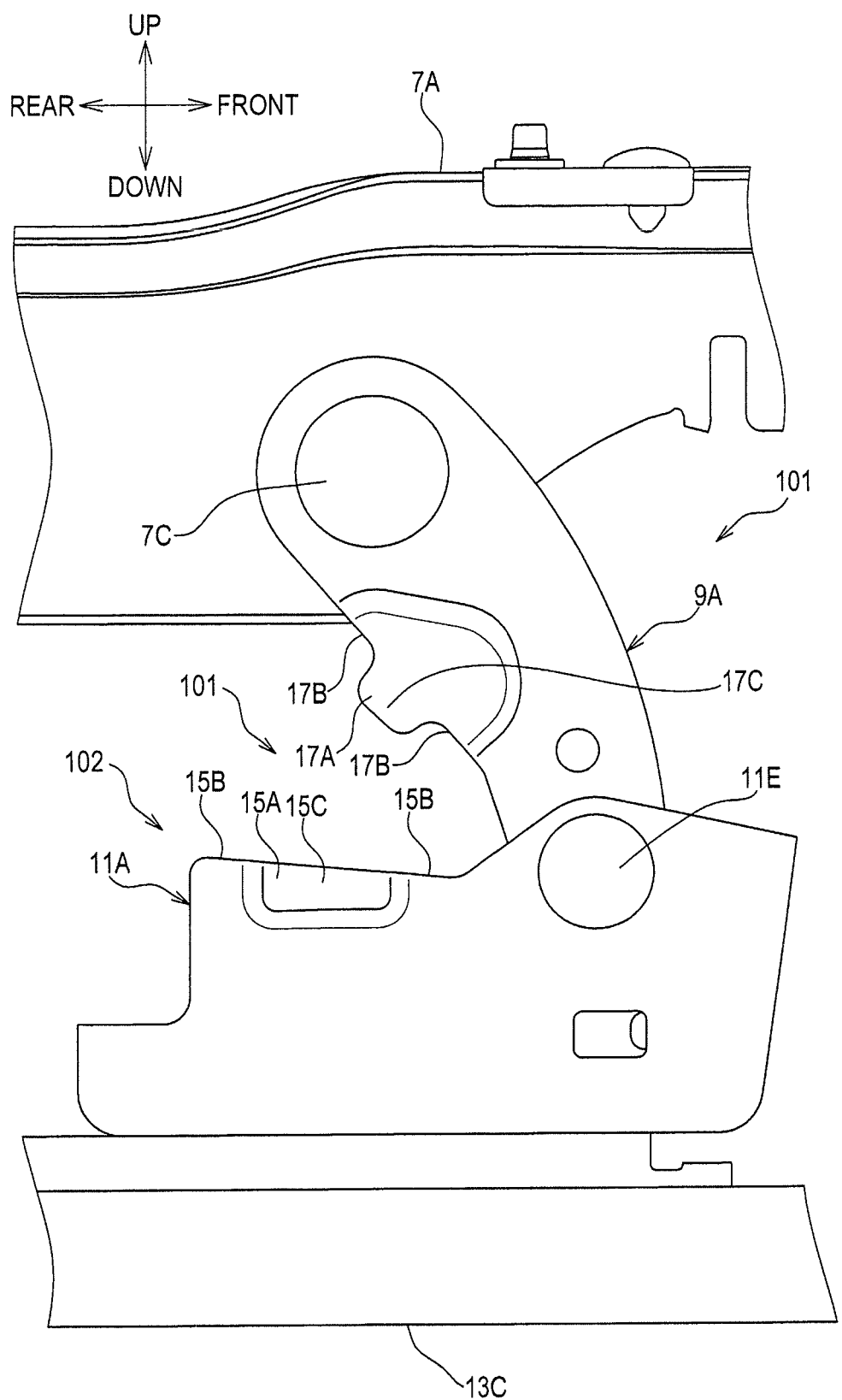
FIG. 2 is a front view of a bracket and a lifter link according to the present embodiment.

As shown in FIG. 2, specifically, the first restriction structure 101 is configured by a first restrictor 15A and a first abutting portion 17A. The second restriction structure 102 is configured by a second restrictor 15B and a second abutting portion 17B.

Figure 3:
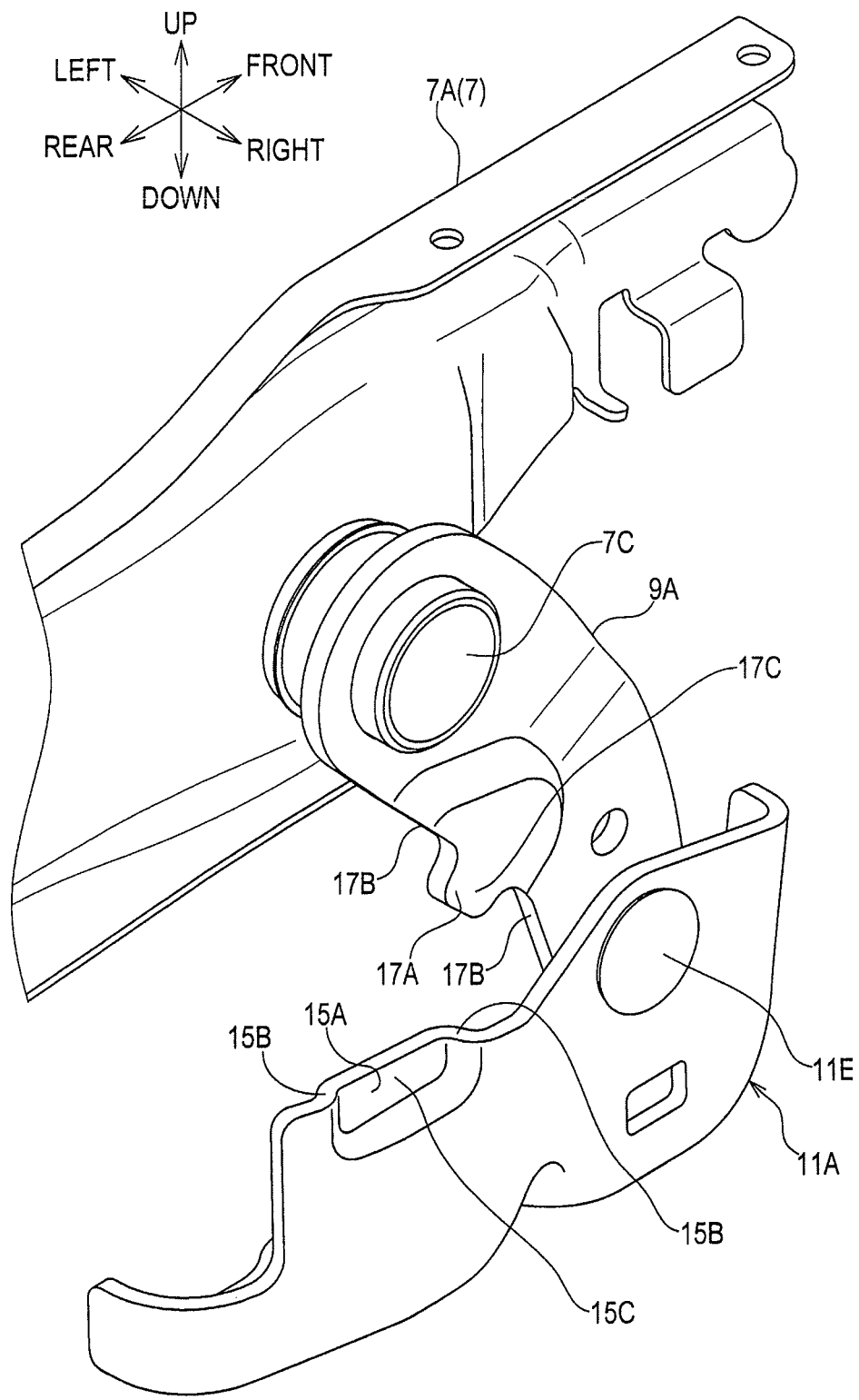
FIG. 3 is a perspective view of the bracket and the lifter link according to the present embodiment.

As shown in FIG. 3, the second restrictor 15B is included in an upper edge of the bracket 11A. The second abutting portion 17B is included a portion in an edge of the lifter link 9A, which faces (confronts) the second restrictor 15B.

Figure 4:
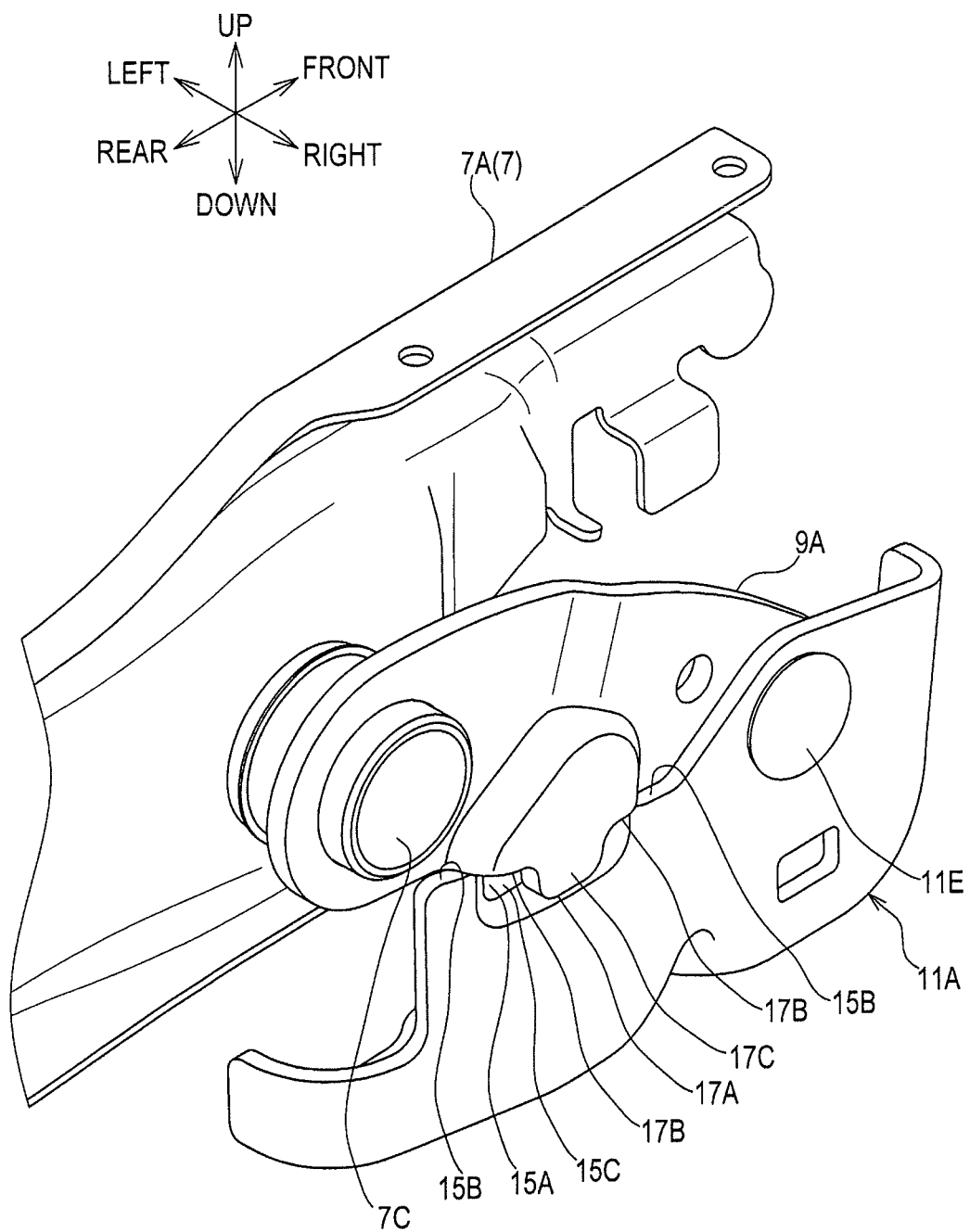
FIG. 4 is a perspective view of the bracket and the lifter link according to the present embodiment.

The second restrictor 15B and the second abutting portion 17B are distanced from each other with the cushion frame 7 being in the highest position. When the lifter link 9A pivots to allow the descendent of the cushion frame 7 and thereafter the second abutting portion 17B abuts against the second restrictor 15B (see, FIG. 4), the cushion frame 7 then stops descending.

Specifically, the second restrictor 15B abuts against the second abutting portion 17B, thereby restricting a displacement of the lifter link 9A further below the specific position. In other words, second restrictor 15B and the second abutting portion 17B are positioned so as to enable the abutment against each other in response to the pivoting of the lifter link 9A.

The first restrictor 15A restricts the displacement of the lifter link 9A along the width axis (in the left direction, in the present embodiment) beyond a specific position in response to an abutment of the first restrictor 15A against the first abutting portion 17A. As shown in FIG. 3, the first restrictor 15A is included in the bracket 11A. The first abutting portion 17A is included in the lifter link 9A.

The first restrictor 15A according to the present embodiment is located in a first protrusion 15C that protrudes toward the second side frame 7B. The first protrusion 15C is a portion in the upper end of the bracket 11A that protrudes toward the second side frame 7B (in the left direction, in present embodiment).

The first restrictor 15A is located on a seat-right surface of the first protrusion 15C. The first protrusion 15C is one integral piece with the bracket 11A that is formed by plastic working such as press working.

The first abutting portion 17A is located in a second protrusion 17C that oppositely protrudes with respect to the second side frame 7B, in other words, protrudes in the right direction of the seat. The first abutting portion 17A is located on a seat-left surface of the second protrusion 17C.

The second protrusion 17C is one integral piece with the lifter link 9A that is formed by plastic working such plastic working. The second restrictor 15B is located in an upper edge of the first protrusion 15C. The second abutting portion 17B is located in an edge of the second protrusion 17C.

Figure 5:
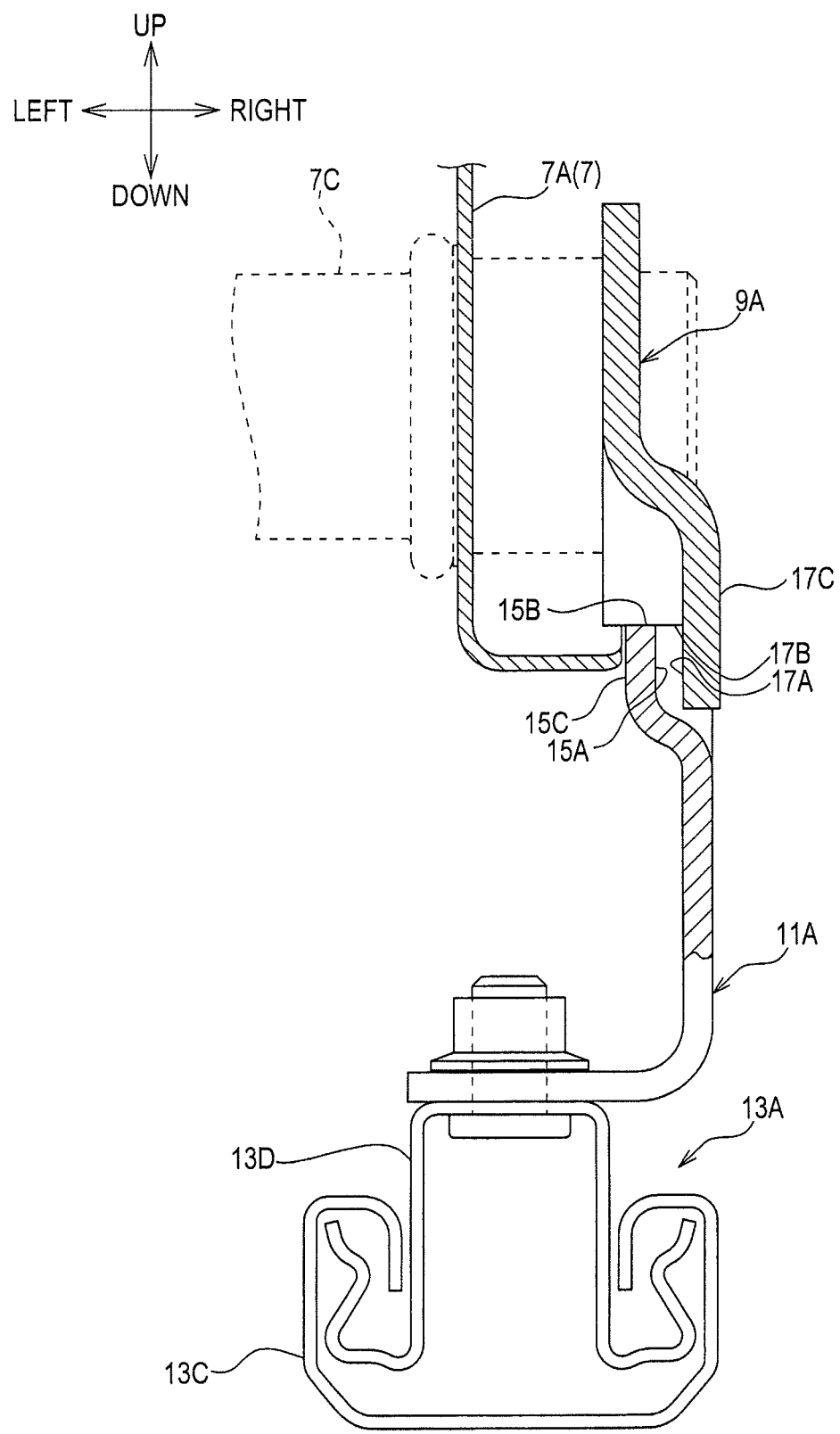
FIG. 5 is a sectional view of the bracket and the lifter link according to the present embodiment.

The first restrictor 15A and the first abutting portion 17A are distanced from each other with the cushion frame 7 being in the highest position. As shown in FIG. 5, the first restrictor 15A and the first abutting portion 17A are distanced from each other along the width axis when the cushion frame 7 descends and thereafter the second abutting portion 17B abuts against the second restrictor 15B.

The first restrictor 15A and the first abutting portion 17A can abut against each other in a state shown in FIG. 5, in other words, in a state where the second abutting portion 17B comes adjacent to the second restrictor 15B or in a state where the second abutting portion 17B abuts against the second restrictor 15B.

In the state that enables the abutment between the first restrictor 15A and the first abutting portion 17A, a significant external force may act on the cushion frame 7 in the left direction. In this case, the first abutting portion 17A abuts against the first restrictor 15A, thereby restricting the displacement of the lifter link 9A, in other words, the displacement of the cushion frame 7 in the left direction.

3. Features of Vehicle Seat of the Present Embodiment

The first restrictor 15A is included in the bracket 11A that serves to restrict the displacement of the lifter link 9A along the width axis in response to the abutment of the first restrictor 15A against the first abutting portion 17A that is included in the lifter link 9A. With such a configuration, it is possible to inhibit the cushion frame 7 to be largely displaced along the width axis.

The lifter link 9A is pivotably coupled to the cushion frame 7 and the bracket 11A. In such a configuration, the cushion frame 7 is displaced downwardly in response to the large displacement of the cushion frame 7 along the width axis.

Accordingly, using the bracket 11A and the lifter link 9A, which are coupled to each other, to restrict the displacement of the cushion frame 7 along the width axis can inhibit the displacement while reducing the number of members and parts.

In the upper end of the bracket 11A, the second restrictor 15B is included that serves to restrict the downward displacement of the lifter link 9A in response to the abutment of the second restrictor 15B against the second abutting portion 17B included in the edge of the lifter link 9A. With such a configuration, it is possible to inhibit the cushion frame 7 to be largely displaced along the width axis and an up-down axis.

The vehicle seat 1 according to the present embodiment is configured as follows.

Specifically, in the upper end, the lifter link 9A is coupled to the first side frame 7A. In the lower end, the lifter link 9A is coupled to the bracket 11A with the lower end of the lifter link 9A being located closer to the second side frame 7B than the bracket 11A is. The first restrictor 15A is located closer to the second side frame 7B than the first abutting portion 17A is.

In the vehicle seat 1 with the above configuration, the cushion frame 7 is likely to be largely displaced toward a second side frame 7B-side, thus enhancing an effect to inhibit the displacement.

The first restrictor 15A is located in the first protrusion 15C that protrudes toward the second side frame 7B. With such a configuration, it is possible to arrange the first restrictor 15A easily.

The first abutting portion 17A is located in the second protrusion 17C that oppositely protrudes with respect to the second side frame 7B. With such a configuration, it is possible to arrange the first abutting portion 17A easily.

The first restrictor 15A and the first abutting portion 17A are respectively located in the protrusions 15C and 17C. With such a configuration, it is possible to inhibit the first restrictor 15A and the first abutting portion 17A to abut against each other at a position a significant distance from the bracket 11A in the width axis. It is therefore possible to reduce a significant bending moment to act on the bracket 11A in response to the abutment between the first restrictor 15A and the first abutting portion 17A.

(Other Embodiments)

For example, the second restrictor 15B and the second abutting portion 17B may be omitted.

For example, the first restrictor 15A and the first abutting portion 17A may be respectively included in a lifter link other than the lifter link 9A and a bracket other than the bracket 11A.

The first restrictor 15A may be located in portion(s) other than the first protrusion 15C. The first abutting portion 17A may be located in portion(s) other than the second protrusion 17C.

In the upper end, the lifter link 9A may be coupled to a member other than the first side frame 7A. The lower end of the lifter link 9A may not be located closer to the second side frame 7B than the bracket 11A is, The vehicle seat 1 may be used for seats used in railroad vehicles, ships, boats, and aircrafts, as well as for built-in seats used in theaters and homes.

The present disclosure is not limited to the aforementioned embodiments as long as it falls within the spirit of the invention described in claims. Accordingly, the present disclosure may be configured in combination of at least two of the above-described embodiments.

What is claimed is:

1. A vehicle seat that is mounted onto a vehicle, the vehicle seat comprising:
a cushion frame that forms a framework of a seat cushion,
a bracket that is configured to be coupled to a vehicle body, wherein the bracket comprises a first protrusion that protrudes along a seat-width axis and is configured to couple the cushion frame to the vehicle body, a lifter link that couples the cushion frame to the bracket and supports the cushion frame, wherein the lifter link is pivotable along a front-rear axis of the seat with an upper end of the lifter link being pivotably coupled to the cushion frame and a lower end of the lifter link being pivotably coupled to the bracket, and a first restrictor that is included in the bracket, wherein the first restrictor is located in the first protrusion and restricts a displacement of the lifter link along the seat-width axis in response to an abutment of the first restrictor against a first abutting portion that is included in the lifter link.

2. The vehicle seat according to claim 1, wherein an upper end of the bracket includes a second restrictor that is configured to restrict a downward displacement of the lifter link in response to an abutment of the second restrictor against a second abutting portion that is included in an edge of the lifter link.

3. The vehicle seat according to claim 1,
wherein the cushion frame comprises:
   a first side frame that extends along the front-rear axis of the seat; and
   a second side frame that is located a distance from the first side frame along the seat-width axis and extends along the front-rear axis of the seat,
wherein the upper end of the lifter link is coupled to the first side frame,
wherein the lower end of the lifter link is coupled to the bracket with the lower end of the lifter link being located closer to the second side frame than the bracket is, and
wherein the first restrictor is located closer to the second side frame than the first abutting portion is.

4. The vehicle seat according to claim 3, wherein the first protrusion protrudes toward the second side frame.

5. The vehicle seat according to claim 3, wherein the first abutting portion is located in a second protrusion that oppositely protrudes with respect to the second side frame.

6. The vehicle seat according to claim 3, wherein the first side frame is located closer to the second side frame than the upper end of the lifter link is.

7. The vehicle seat according to claim 1, further comprising:
   a fixed rail that is configured to be fixed to the vehicle, and
   a movable rail that is slidable with respect to the fixed rail, wherein
   the bracket is fixed to the movable rail, and
   the first restrictor is located above the fixed rail.

8. A vehicle seat that is mounted onto a vehicle, the vehicle seat comprising:
   a cushion frame that forms a framework of a seat cushion,
   a bracket that is configured to be coupled to a vehicle body, wherein the bracket is configured to couple the cushion frame to the vehicle body,
   a lifter link that couples the cushion frame to the bracket and supports the cushion frame, wherein the lifter link is pivotable along a front-rear axis of the seat with an upper end of the lifter link being pivotably coupled to the cushion frame and a lower end of the lifter link being pivotably coupled to the bracket,
   a first restrictor that is included in the bracket, wherein the first restrictor restricts a displacement of the lifter link along a seat-width axis in response to an abutment of the first restrictor against a first abutting portion that is included in the lifter link, and
   a second restrictor that is included in an upper end of the bracket and is configured to restrict a downward displacement of the lifter link in response to an abutment of the second restrictor against a second abutting portion that is included in an edge of the lifter link.

9. A vehicle seat that is mounted onto a vehicle, the vehicle seat comprising:
   a cushion frame that forms a framework of a seat cushion, the cushion frame comprising:
      a first side frame that extends along a front-rear axis of the seat; and
      a second side frame that is located a distance from the first side frame along a seat-width axis and extends along the front-rear axis of the seat;
   a bracket that is configured to be coupled to a vehicle body, wherein the bracket is configured to couple the cushion frame to the vehicle body;
   a lifter link that couples the cushion frame to the bracket, supports the cushion frame, and is pivotable along the front-rear axis of the seat, the lifter link comprising:
      an upper end of the lifter link that is pivotably coupled to the first side frame, and
      a lower end of the lifter link that is pivotably coupled to the bracket and located closer to the second side frame than the bracket is; and
   a first restrictor that is included in the bracket, wherein the first restrictor is located closer to the second side frame than the first abutting portion is and restricts a displacement of the lifter link along the seat-width axis in response to an abutment of the first restrictor against a first abutting portion that is included in the lifter link, wherein the first abutting portion is located in a second protrusion that oppositely protrudes with respect to the second side frame.

* * * * *